Nov. 28, 1950  J. C. STOKES ET AL  2,531,749
QUICK-CHANGE SLUSH NOZZLE
Filed Jan. 6, 1948

John C. Stokes
Charles C. Goolsbee
INVENTOR.

BY J. Vincent Martin
Ralph R. Browning
James B. Simms
ATTORNEYS

Patented Nov. 28, 1950

2,531,749

UNITED STATES PATENT OFFICE 2,531,749

QUICK-CHANGE SLUSH NOZZLE

John C. Stokes and Charles C. Goolsbee, Houston, Tex., assignors to Reed Roller Bit Company, Houston, Tex., a corporation of Texas Application January 6, 1948, Serial No. 714

5 Claims. (Cl. 285—163)

This invention relates to improvements in quick change slush nozzle devices and refers more particularly to such devices that are adapted to be secured within the slush port of a rotary well drilling bit.

This invention is an improvement to that shown in U. S. Patent No. 2,408,892, dated October 8, 1946.

In the slush nozzle device of the patent the wall of the bit body at the slush port, together with the inner end of a tubular bushing was employed to provide a chamber for receiving plastic sealing material. While the patented structure works satisfactorily in the instances wherein it may be used, nevertheless the structure is not universally applicable to all bits. It has been found to be desirable to make a quick change slush device which is complete in itself and does not rely upon a portion of the bit body to provide a chamber for the sealing material.

An object of this invention is to provide a quick change slush nozzle device which is a complete unit and is adaptable for use universally with rotary type drill bits.

Another object of this invention is to provide a quick change slush nozzle device which is a complete unit and is adaptable for use universally with rotary type drill bits, wherein the unit includes a bushing and nozzle assembly extending therethrough, the bushing and assembly having confronting parts providing a substantially closed, annular chamber for packing material to provide a seal therebetween.

A further object is to provide a quick change slush nozzle device of the type employing a sleeve for releasably securing the nozzle within a bushing in which the bushing has a countersunk portion which provides a seat for sealing material upon assembly of the device.

Other and further objects of this invention will appear from the following description.

In the accompanying drawings which form a part of the instant specification, are to be read in conjunction therewith and wherein like reference numerals are employed to designate like parts in the various views.

Figure 1:
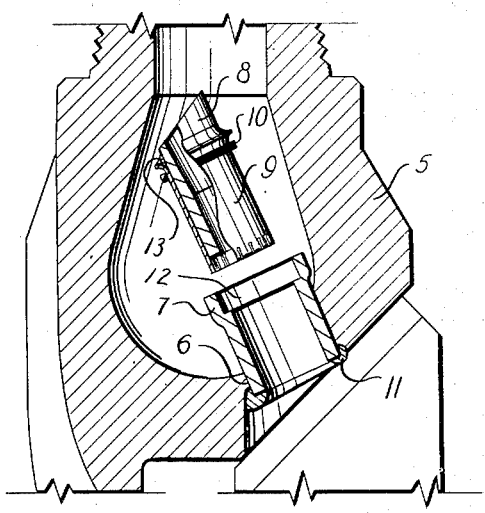
Fig. 1 is a sectional elevation of a bit body equipped with a quick change slush nozzle device constituting an embodiment of this invention and shown in exploded view.

Referring to the drawings, numeral 5 designates a bit body of a drag type bit equipped with a slush port 6. While a drag type bit has been shown with a single port it is to be understood that the invention is applicable to any rotary type bit such as roller bits and that the bit may be equipped with a plurality of mud ports.

The quick change slush nozzle device comprises a bushing 7, a nozzle 8, a sleeve 9 and a seal member 10. The bushing may be secured in a semi-permanent fashion within mud port 6 by suitable welding as shown at 11. The bushing has a bore therethrough adapted to receive a nozzle assembly. The bushing and assembly have confronting annular parts providing a substantially closed chamber for packing material. In the embodiment shown this part of the bushing is a countersunk portion 12 at one end of the bushing bore. This countersunk portion provides an annular interior shoulder which, together with the wall of the countersunk portion and the nozzle-sleeve assembly, provides a packing chamber in a manner to be hereinafter described.

Nozzle 8 is a relatively elongated tubular member and has secured thereto sleeve 9. Preferably the sleeve is secured to the nozzle by welding shown at 13 which welds the bell end of the sleeve to the nozzle. In any event the nozzle-sleeve assembly is secured together and formed with an annular shoulder or bead externally thereof which, in the embodiment shown, is the bell end of the sleeve. The end of sleeve 9 remote from the bell end is axially slotted or castellated and provides a means for securing the nozzle-sleeve assembly within the bushing in a manner to be hereinafter more fully described.

Upon assembly of the device the nozzle and sleeve extend into the bushing port and the outer periphery of the sleeve closely fits the inner periphery of the small bore of the bushing. Seal ring 10, formed of rubber, synthetic rubber or other sealing material resides within the countersunk portion of the bushing bore and as the nozzle and sleeve are forced downwardly to bring the bell end of the sleeve toward the internal shoulder of the bushing sealing material 10 is tightly pressed to provide a seal between the bushing and the nozzle-sleeve assembly. This also provides a cushion mounting for the assembly within the bushing reducing the likelihood of parts failure due to fatigue.

The nozzle-sleeve assembly may be secured within the bushing by means which are partly carried by the sleeve and bent outwardly. In this embodiment this means includes the castellated portion of the sleeve which provides segments 14 bent outwardly to engage the welding material surrounding the sleeve. Obviously if the welding material does not cover the end of bushing 7 segments 14 may be bent into engagement with the end of the bushing. With segments 14 bent outwardly the sleeve and nozzle are secured against axial movement within bushing 7. The nozzle or sealing material may be readily changed in the event of wear or for other causes by bending segments 14 inwardly whereby the nozzle may be withdrawn from the bushing.

It is contemplated that the bushing and nozzle may be made of wear resisting material or that the surfaces thereof may be hardened or otherwise treated whereby these parts will better resist the cutting action of the gritty drilling fluid.

Figure 2:
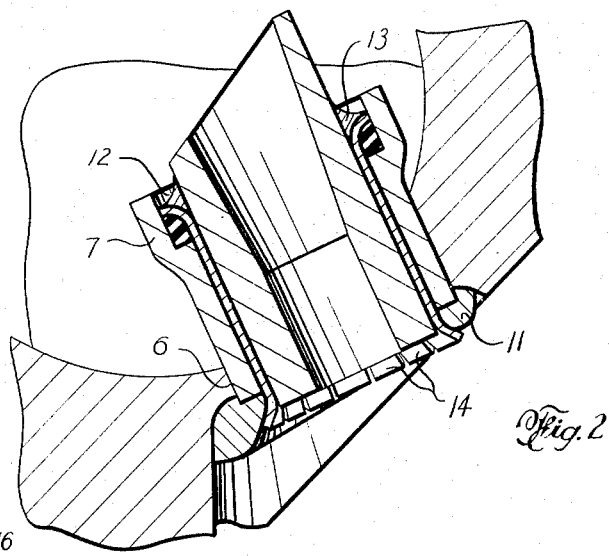
Fig. 2 is a fragmentary view upon an enlarged scale showing the slush nozzle device of Fig. 1 in assembled relation.
Figure 3:
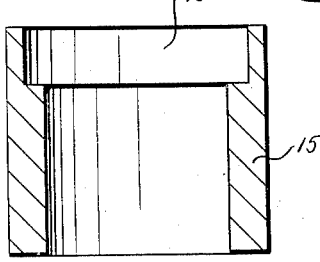
Fig. 3 is a sectional elevation through a modified type bushing for use in accordance with this invention.

The modified bushing 15 of Fig. 3 is substantially the same as that shown in Figs. 1 and 2, but instead of having a bell end or flared end to provide the seal chamber for sealing material 10 the bushing has a cylindrical external contour and is provided with a countersunk portion 16 at one end.

It is believed apparent that this installation provides a quick change slush nozzle device which is a complete unit and may be installed in any slush port of any rotary type drilling bit. The device is complete within itself and the bit body does not function in conjunction therewith except that the device is rigidly secured to the bit body by welding 11. The replaceable nozzle and the seal therefor does not rely upon the bit body for its effectiveness.

The device may be readily assembled within a bit body but it has been found that the special tool shown in Patent No. 2,408,892, referred to above, aids installation of the device.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

Having described our invention, we claim:

1. A slush nozzle device comprising a bushing adapted to be secured in a slush port of a bit, the bushing having an annular shoulder adjacent one end of the bore therethrough, a slush nozzle with a sleeve secured thereto extending into the bushing and past the shoulder, a bell end on the sleeve, packing material within the bushing and confined between the bell end of the sleeve and the annular shoulder and means partly carried by the sleeve and engaging the bushing to secure the sleeve against axial movement in the bushing.

2. A slush nozzle device comprising a bushing adapted to be secured in a slush port of a bit, the bushing having a bore therethrough with a countersunk portion at one end, an assembly made up of a slush nozzle with a sleeve secured thereto extending into the bushing and past the countersunk portion, an external shoulder upon the assembly fitting within the countersunk portion of the bushing, packing material within the bushing and confined between the shoulder and the closed end of the countersunk portion and means partly carried by the sleeve and engaging the bushing to secure the assembly against axial movement in the bushing.

3. A slush nozzle device comprising a bushing adapted to be secured in a slush port of a bit, the bushing having a bore therethrough with a countersunk portion at one end, an assembly made up of a slush nozzle with a sleeve secured thereto extending into the bushing and past the countersunk portion, an external shoulder upon the assembly fitting within the countersunk portion of the bushing and packing material within the bushing between the shoulder and the closed end of the countersunk portion, said sleeve having an axially slotted end providing segments bent outwardly to secure the slush nozzle assembly within the bushing.

4. A slush nozzle device comprising a bushing adapted to be secured in a slush port of a bit, the bushing having a bore therethrough with a countersunk portion at one end, an assembly made up of a slush nozzle with a sleeve secured thereto extending into the bushing and past the countersunk portion, an external shoulder upon the assembly fitting within the countersunk portion of the bushing, and packing material within the bushing and confined between the shoulder and the closed end of the countersunk portion, said sleeve having a portion bent outwardly around the end of the bushing to secure the slush nozzle assembly within the bushing.

5. A slush nozzle device comprising a bushing adapted to be secured in a slush port of a bit, the bushing having a bore therethrough, an assembly made up of a slush nozzle with a sleeve completely encircling and secured thereto extending into the bushing, cooperating and confronting annular parts upon the bushing and assembly providing a substantially closed annular chamber therebetween, packing material within the chamber filling the same and providing a seal between the bushing and assembly and means partly carried by the sleeve engaging one end of the bushing to releaseably secure the assembly against axial movement in the bushing bore.

JOHN C. STOKES.
CHARLES C. GOOLSBEE.

REFERENCES CITED

The following references are of record in the file of this patent:

UNITED STATES PATENTS

| Number | Name | Date |
|---|---|---|
| 1,039,354 | Bonadio | Sept. 24, 1912 |
| 2,429,782 | Versoy | Oct. 28, 1947 |